Nov. 8, 1932.  G. D. GARDNER  1,886,388
ARTICHOKE TRIMMING AND CORING MACHINE
Filed May 31, 1930   5 Sheets-Sheet 3
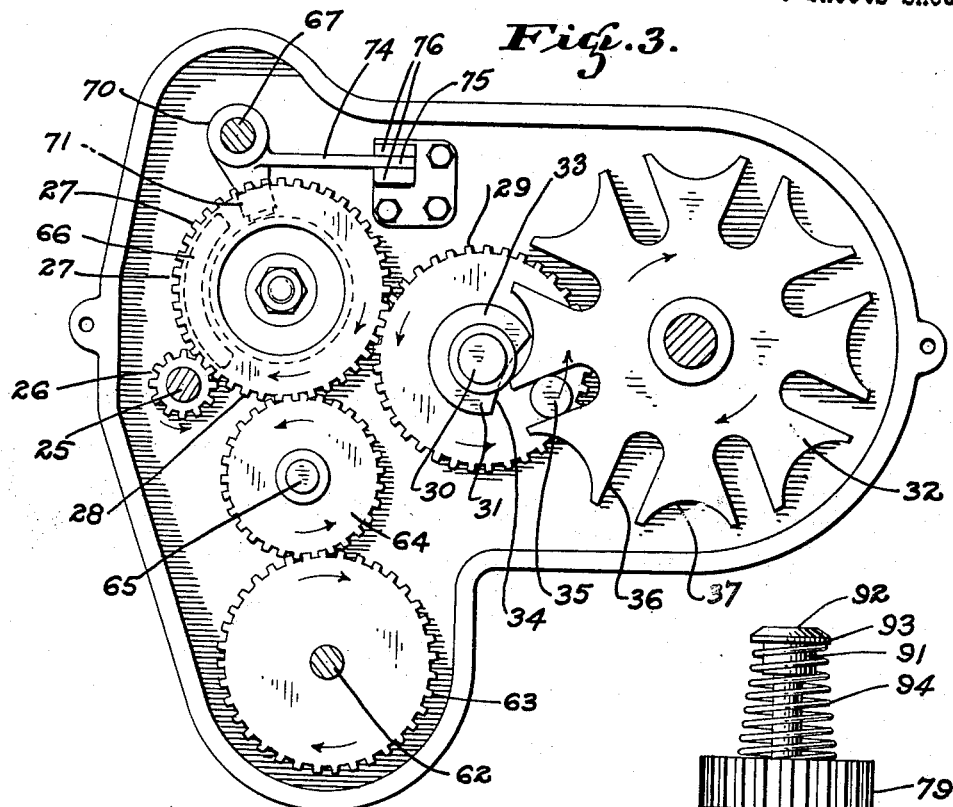
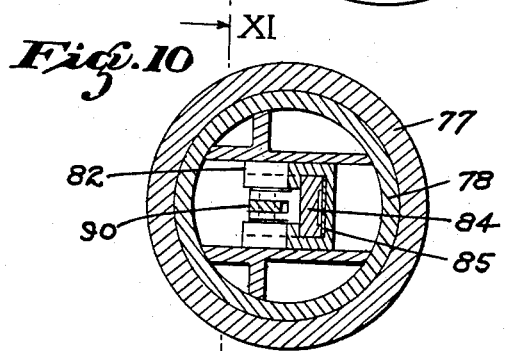
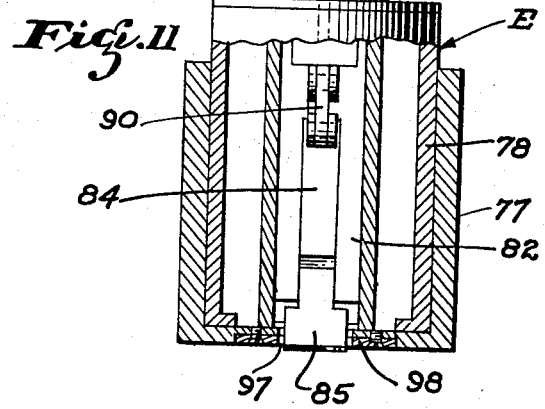
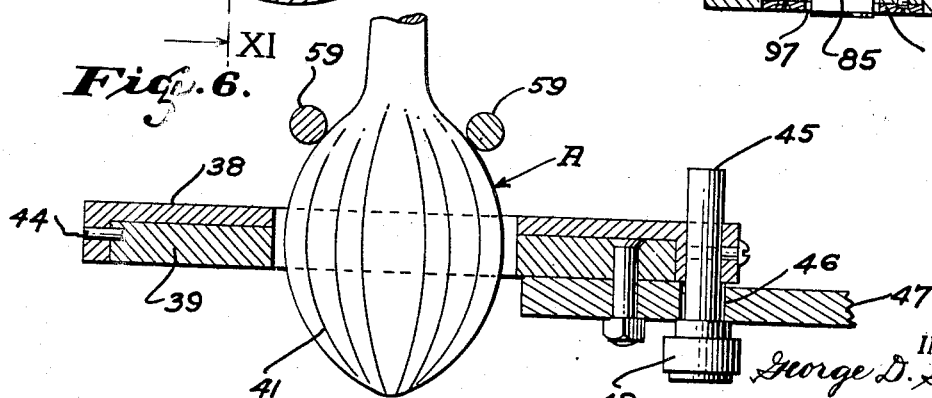
INVENTOR.
George D. Gardner.
BY Townsend, Loftus & Abbett
ATTORNEYS.

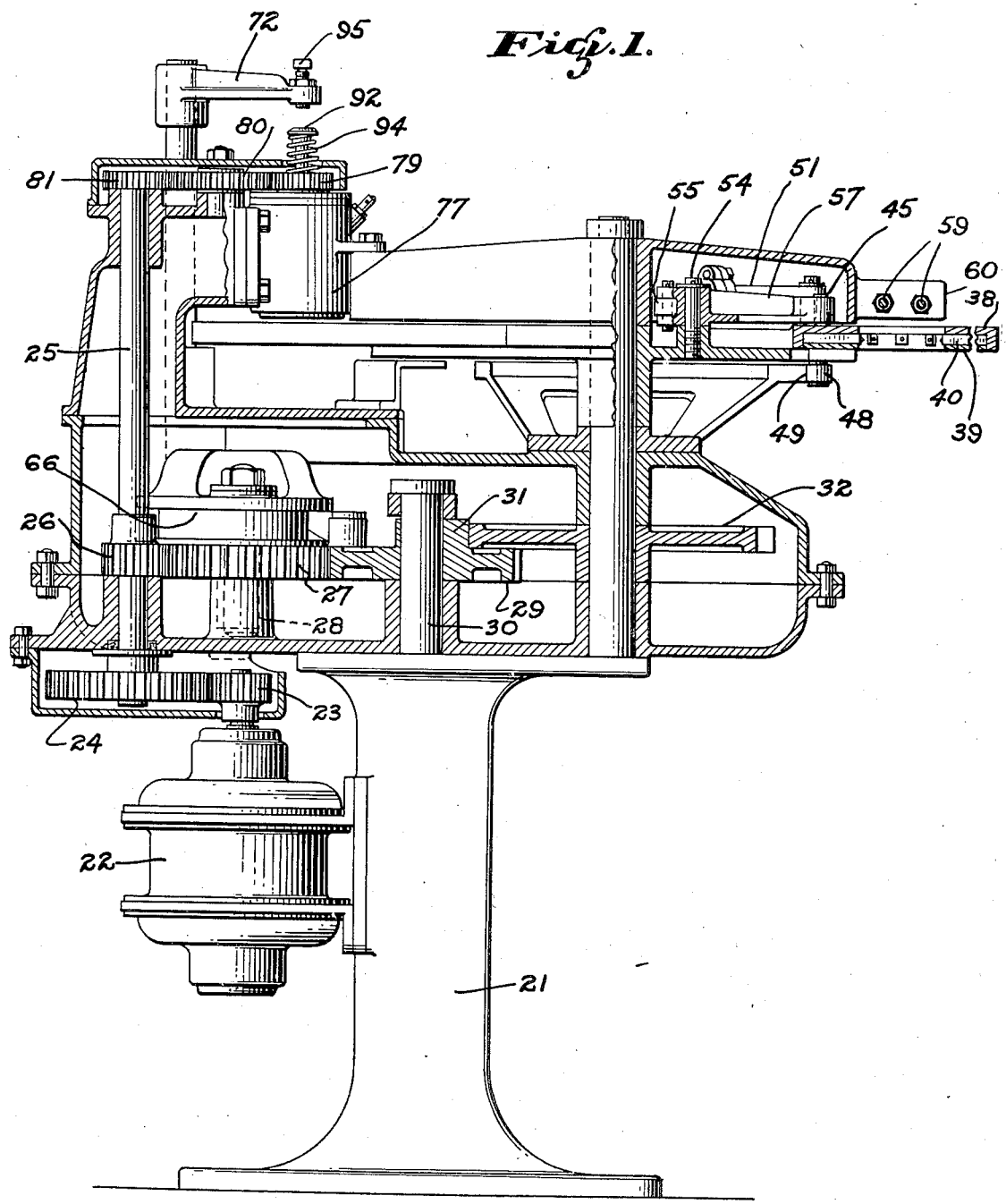

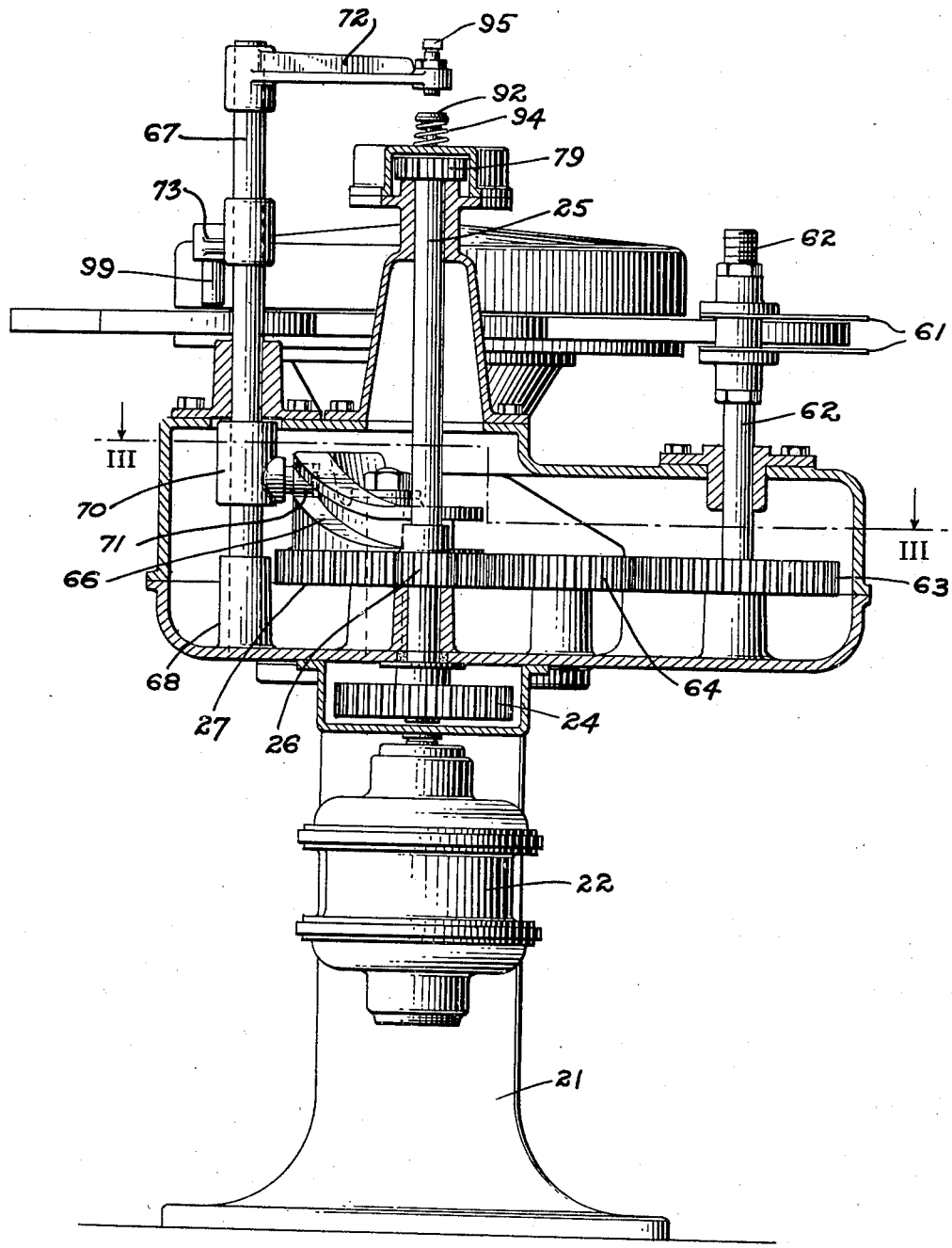

Nov. 8, 1932.  G. D. GARDNER  1,886,388
ARTICHOKE TRIMMING AND CORING MACHINE
Filed May 31, 1930   5 Sheets-Sheet 4
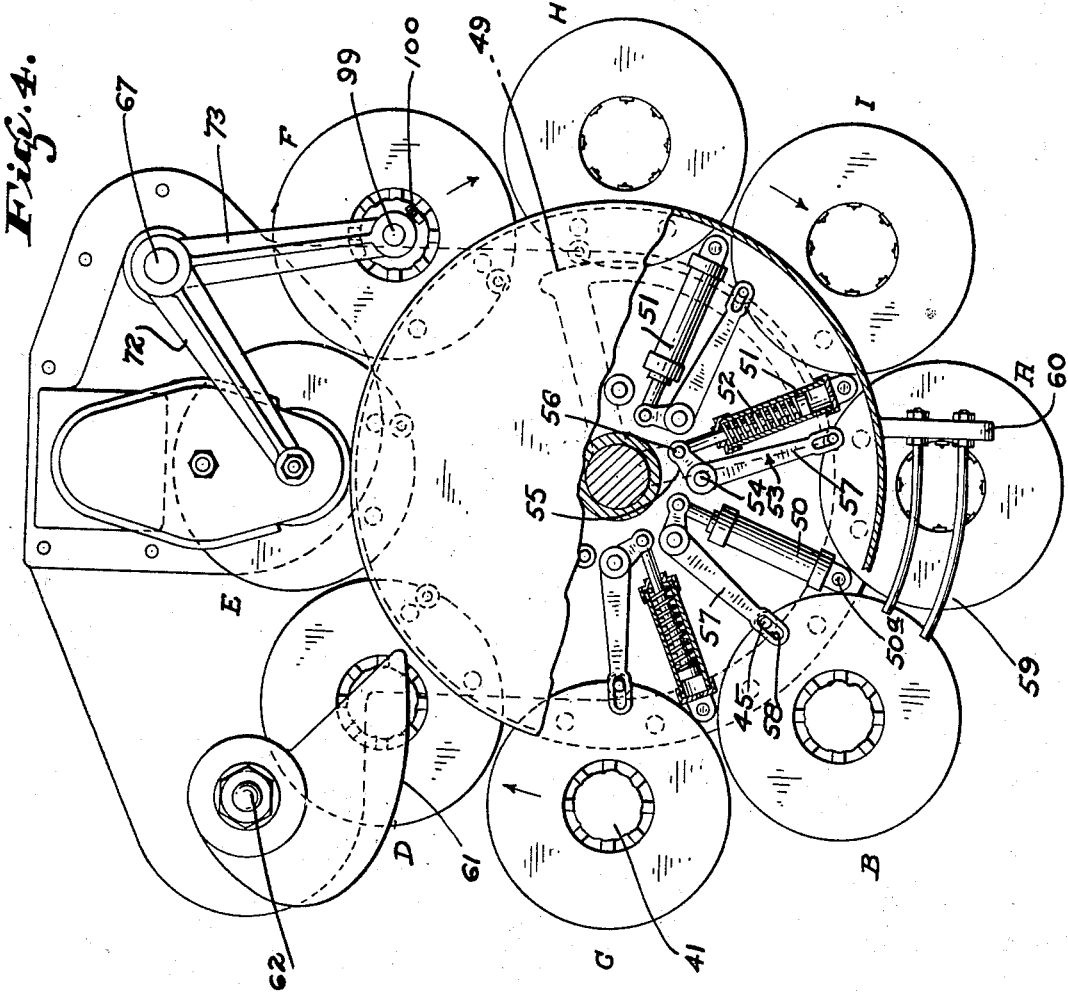

Nov. 8, 1932.  G. D. GARDNER  1,886,388
ARTICHOKE TRIMMING AND CORING MACHINE
Filed May 31, 1930  5 Sheets-Sheet 5
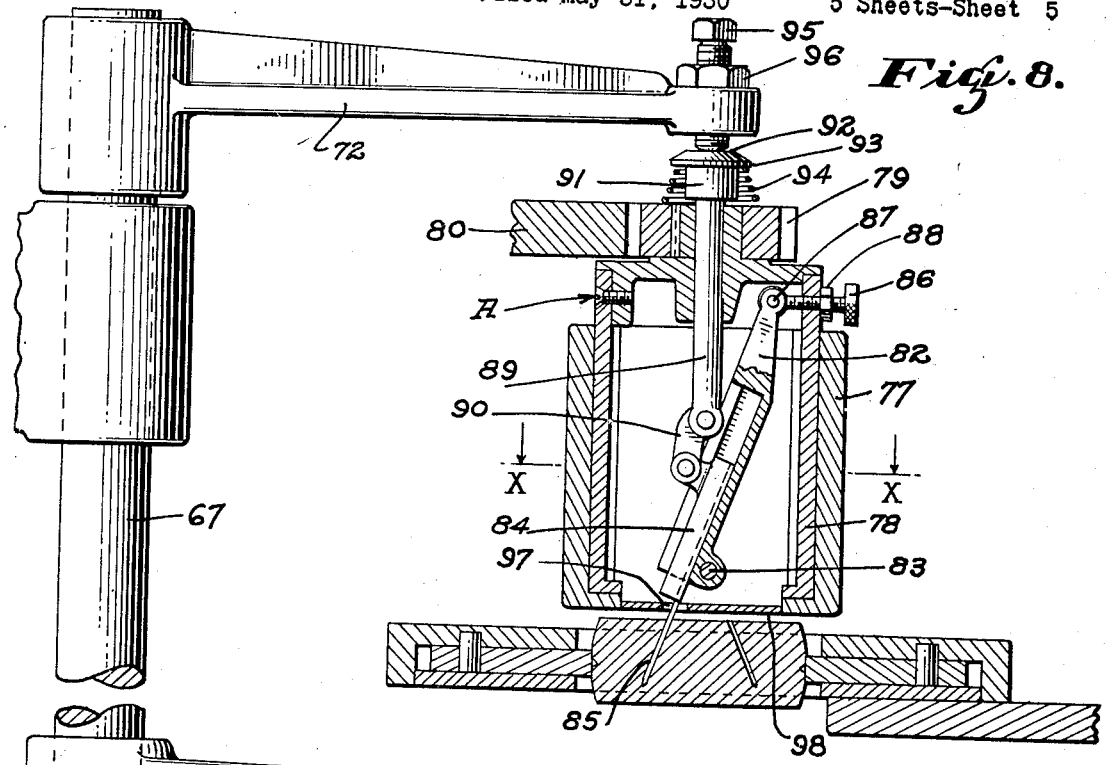
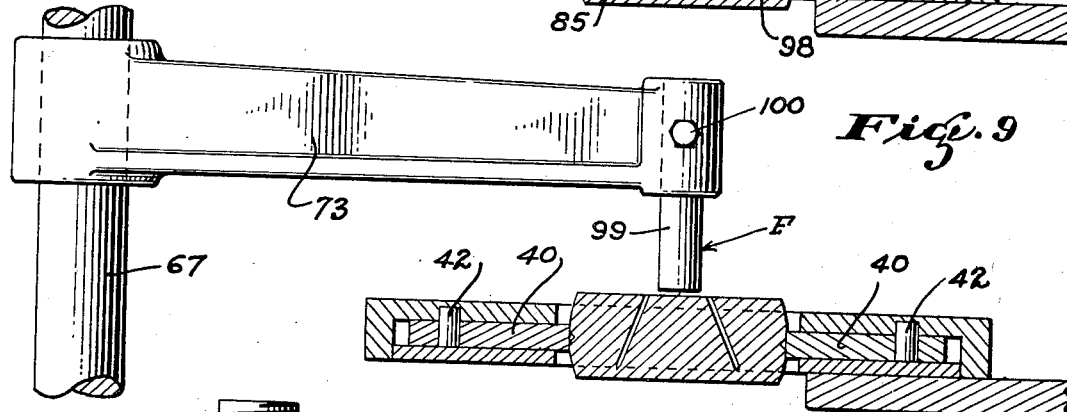
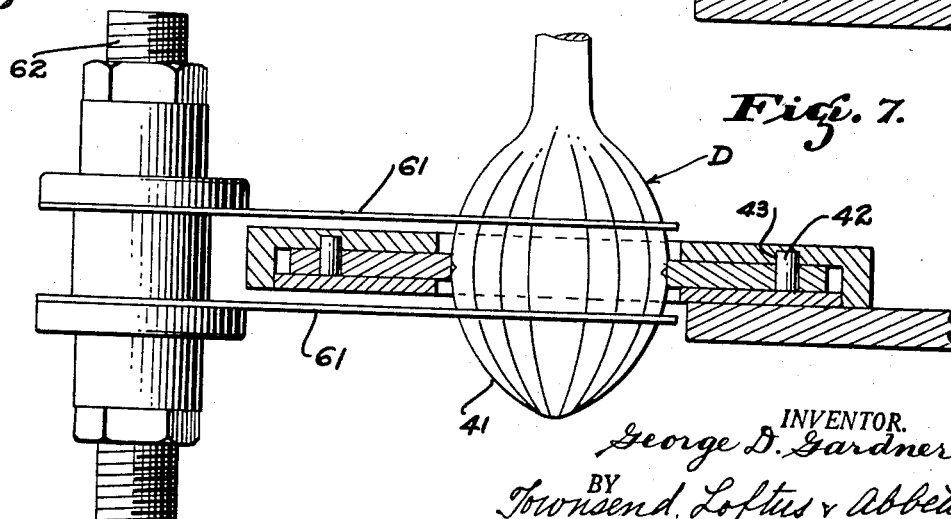
INVENTOR.
George D. Gardner.
BY Townsend, Loftus & Abbett
ATTORNEYS.

Patented Nov. 8, 1932

1,886,388

UNITED STATES PATENT OFFICE

GEORGE D. GARDNER, OF SAN JOSE, CALIFORNIA, ASSIGNOR TO BARRON GRAY PACKING COMPANY, OF SAN JOSE, CALIFORNIA, A CORPORATION OF CALIFORNIA

ARTICHOKE TRIMMING AND CORING MACHINE

Application filed May 31, 1930. Serial No. 458,491.

This invention relates to apparatus for separating the desired parts of vegetables or fruits from the undesirable parts thereof.

An object of the invention is to provide a machine into which the fruit or vegetable may be inserted and which will then automatically separate the central part thereof from the outside.

Another object of the invention is the provision of a machine which will automatically trim off the tops and bottoms of artichokes, cut out the cores thereof, and discharge such cores from the machine.

Other objects of the invention will be apparent from the appended description.

Referring to the drawings forming a part of this specification—

Fig. 1 is a vertical, sectional view thereof looking from the right hand side of Fig. 2, Fig. 2 is a vertical sectional view thereof looking from the left side of Fig. 1, Fig. 3 is a horizontal section on the line III—III of Fig. 2, Fig. 4 is a plan view with parts broken away, Fig. 5 is a plan view of the means for holding the artichoke, or other vegetable, or fruit, and the mechanism for operating the same, Fig. 6 is a vertical sectional view thereof, Fig. 7 is a plan view, partially in section, showing the operation of the trimming knives, Fig. 8 is a similar view showing the operation of the coring knife, Fig. 9 is a similar view showing the operation of the core ejector, Fig. 10 is a horizontal section on the line X—X of Fig. 8, and Fig. 11 is a vertical section on the line XI—XI of Fig. 10.

My improved machine is suitably supported on a standard 21, this also supporting a prime mover for the machine such as a motor 22, the shaft of which is vertical. A pinion 23 is fixed to the motor shaft, this pinion driving gear 24 fixed on a shaft 25. A pinion 26 is fixed on the shaft 25 and drives the gear 27 on the shaft 28, the gear 27, in turn, meshing with and driving the gear 29 on the shaft 30. Mounted on the shaft 30 is the driving member 31 of a Geneva movement of which the Geneva wheel 32 is the driven member, whereby the machine rotates intermittently each time for a part of a revolution with periods of rest in between, during which time the parts function at the various stations as described hereinafter. The Geneva movement is formed in the usual manner, the driving member of which comprises a cylindrical portion 33 broken away at 34, and a pin 35 which rides in the slots 36 of the driven member during movement thereof while the cylindrical part of the driving member rides in the correspondingly shaped parts 37 of the driven member.

For operation upon artichokes, I prefer four operations, namely, feeding, trimming, cutting the core, and ejecting the core, and I find it convenient to have the machine operated eight times during one revolution, whereby eight artichokes are fed into the machine during each such revolution. Referring to Fig. 4, A indicates the station at which the artichokes are fed into the machine; B and C are idle stations; at station D the tops and stems of the artichokes are trimmed off; at station E the core is cut; at station F the core is ejected; while stations H and I are idle stations.

I provide a series, preferably eight in number, of artichoke gripping means, as illustrated in Figs. 4 and 5, each comprising two parallel plates 38 and 39 rotatable with respect to each other, which movement of rotation is limited. One such plate as the plate 39 is provided with a series of radial grooves, each to accommodate one of the gripping fingers 40 which slide back and forth in these grooves to grip the work 41. Each of the gripping fingers 40 is provided with a lug 42, each of which rides in a curved slot 43 in the plate 38. Thus relative rotation of the two plates will cause the gripping fingers to approach or to recede from the center of the gripping means to grip or release the work. The plates 38 and 39 are connected together by screws 44 fitting into a hole in one of the members and riding in a slot in the other, so that relative rotary movement is permitted. Each plate 38 carries a pin 45 projecting through both plates and adapted to move in a slot 46 in a plate 47 attached to and forming an extension of the plate 39. At the lower end of the pin 45 is a roller 48 adapted to strike the cam 49 as the machine rotates and thus to cause relative movement of the plates 38 and 39 to open the gripping fingers. A cylinder 50 is pivotally mounted at 50a on the rotating table at each of the work gripping members, a piston 51 being capable of longitudinal movement within said cylinder, but being normally held at the outer end of the cylinder by the compression spring 52. A bell-crank lever 53 is pivotally mounted on the table at 54, the arm 55 thereof being pivotally connected at 56 to the end of the piston rod; while the other arm 57 of the bell-crank lever is provided with a slot 58, in which the upwardly projecting part of the pin 45 rides. As the table rotates clockwise, as seen in Fig. 4, the roller 48 strikes the cam 49 and is thus somewhat retarded in its movement, whereby the gripping fingers 41 are retracted from each other so that they will be open at the station A where the work may be inserted manually. After the work has been inserted, the roller 48 leaves the cam 49, as a result of which the spring 52 will cause the arm 57 of the bell-crank lever to swing outwardly, whereby the fingers will approach each other and grip the work resiliently, due to the effect of the springs 52. Guide bars 59 are provided at the feeding station above the work gripping member to determine the distance that the work is inserted through the gripping member and these guide bars may be curved as desired and suitably supported in a standard 60.

With an artichoke inserted at station A, as illustrated in Fig. 6, such artichoke will be rotated past stations B and C and then at station D it will be trimmed by removal therefrom of the top and bottom by means of the rotating parallel cutting knives 61 mounted on the shaft 62 provided with a gear 63, which is in mesh with and actuated by a gear 64 mounted on the shaft 65, the gear 64 being, in turn, in mesh with and actuated by the gear 27. A cam 66 is mounted to rotate with a shaft 28 and gear 27. A standard 67 is mounted for vertical movement in the support 68 and attached to the standard 67 is a sleeve 70 carrying a pin 71 which rides in the cam track 66. This cam track has a rise and fall whereby the standard 67 will be moved upwardly and downwardly at the proper time. The standard 67 carries at its top two arms 72 and 73, the arm 72 carrying the coring knife and the arm 73 carrying the core ejector, while the standard is prevented from rotation by a guide arm 74 thereon riding in a vertical track 75 formed by the guide members 76.

A casing 77 is fixedly attached to the framework within which the knife member rotates, this comprising an inner casing 78 projecting upwardly beyond the casing 77 and having a gear 79 provided at the top thereof, this intermeshing and being driven by the gear 80, which, in turn, is driven by the gear 81 on the shaft 25. A knife support 82 is mounted for pivotal movement on the rod 83 fixed to the walls of the rotating casing 78, this support having a groove therein in which the knife holding member 84 may slide at an oblique angle, this member carrying a knife 85. An adjusting screw 86 is provided to bear against the top end 87 of the support 82 to adjust the angle therof, and a locking means such as a nut 88 is provided to hold this adjusting screw in fixed position. A shaft 89 is pivoted at its lower end to a link 90, which, in turn, is pivoted to the knife holding member 84, this shaft being suitably fixed to the gear 79 for rotation therewith, but being slidable therethrough and being provided with a head 91 having a flat upper surface 92 and formed to provide a circular flange 93, a compression spring 94 being provided between such flange and the gear 79.

The arm 72 is provided at its end with an adjustable bolt 95 which may be held in fixed position by the nut 96 and, as a result, when the standard 67 moves downwardly, it forces the shaft 89 downwardly against the compression spring 94 and causes the knife blade 85 to project outwardly obliquely through an opening 97 in the bottom plate 98, the gear 79 at the same time causing the knife to rotate. The core of the artichoke is thus cut from the vegetable at the station E, while at the station F it is ejected therefrom by the plunger 99 adjustably supported in the end of the arm 73 by a screw 100. The artichoke hearts are thus collected at the station F, while the outside parts drop out of the holder as the gripping fingers 40 are retracted or opened.

I have disclosed the cycle of operation with respect to one artichoke, but it is to be understood that an operation takes place at each operating station simultaneously.

Suitable means may be provided to encase the operating parts in order to prevent injury to people working at or about the machine.

I have described the preferred embodiment of my invention merely by way of illustration and not as a limitation thereof, and the scope of the invention is to be limited only as set forth in the annexed claims, since it is apparent that many changes may be made without departing from the spirit of the invention.

Having described my invention, what I claim and desire to secure by Letters Patent of the United States is—

1. In an artichoke coring machine, a series of stations, a rotatable frame, a series of artichoke holders carried by said frame, mechanism to make said holders operative at a station and to maintain them operative for almost, but short of, a complete cycle of the machine, mechanism to remove the tops and bottoms of the held artichokes at a second station, mechanism to core the artichokes at a third station, mechanism to eject said cut cores at a fourth station, and mechanism to make said artichoke holders inoperative short of the end of the cycle of the machine.

2. In an artichoke coring machine, a rotatable frame, a series of artichoke holders thereon each comprising radially arranged fingers, a series of stations, mechanism to cause partial and intermittent rotation of said frame, said rotation ceasing when a holder is at a station, mechanism to cause said fingers to approach each other at a station and to remain so positioned until they reach the last of said stations, a pair of horizontal rotatable knives at another station, one lower than and one higher than said holders, a rotatable shaft at another station, mechanism to rotate said shaft, an oblique knife on said shaft, a core removing plunger at another station, a vertically movable member supporting said oblique knife and said plunger, and means to cause movement of said vertically movable member when one of said holders is at a station, the station for said pair of knives being beyond said first-mentioned station, the station for said oblique knife being beyond the station for said pair of knives, the station for said plunger being beyond the station for said oblique knife.

3. A coring machine, comprising a reciprocable member, diverging arms on said member, a coring knife carried by one of said arms and a coring plunger carried by another of said arms, and means to reciprocate said member whereby the knife and plunger may act simultaneously one on each of two articles held at separate stations.

4. A core cutter comprising a rotary casing, a knife guide pivotally supported at one end in said casing and adustably supported at its other end, a knife slidably mounted in said guide, a reciprocable shaft carried by the casing, means for reciprocating said shaft, and a connection between the shaft and said knife.

5. A core cutter comprising a rotary casing, a knife guide pivotally supported at one end in said casing and adjustably supported at its other end, a knife slidably mounted in said guide, a reciprocable shaft carried by the casing, means for reciprocating said shaft, and a link pivotally connected at one end to the shaft and at its other end to said knife.

6. A core cutter comprising a rotary casing, a slide within the casing and pivotally connected thereto, means to hold said slide at a predesired angle on said pivot, a knife reciprocable in said slide, a shaft reciprocably carried by the casing and passing therethrough, and means connecting said shaft and said knife to cause reciprocating movement of said shaft to be imparted to said knife as a reciprocating movement along said slide.

7. A core cutter comprising a rotary casing, a slide within the casing and pivotally connected thereto, means to hold said slide at a predesired angle on said pivot, a knife reciprocable in said slide, a shaft reciprocably carried by the casing and passing therethrough, and means connecting said shaft and said knife to cause reciprocating movement of said shaft to be imparted to said knife as a reciprocating movement along said slide, movement of said shaft causing said knife to press said slide about said pivot into engagement with said means for holding the slide at a predetermined angle.

8. An apparatus for the described purpose comprising means for holding an artichoke and advancing it with a step by step movement, means for cutting off the stem end of the artichoke at the base of the heart, a rotating knife for forming a groove in said cut stem end at the bases of the outer leaves during a period of rest of the artichoke, and means for separating the heart from said outer leaves during the subsequent period of rest of said artichoke.

9. An apparatus for the described purpose comprising means for cutting off the stem end of an artichoke at the base of the heart, a reciprocating carriage, a rotating knife mounted in said carriage for forming a groove in the cut stem end of the artichoke at the bases of the outer leaves, a punch mounted upon said carriage for separating the heart from said outer leaves, and means for advancing the artichoke to and through the spheres of action of said cutting, grooving and punching means.

10. An apparatus for the described purpose comprising a turret, means positioned about the periphery thereof for holding a plurality of artichokes, a pair of spaced knives positioned one on each side of said turret for cutting off the ends of the artichokes, a rotating knife, means for moving said knife toward said turret from one side to form a groove in the cut stem ends of the artichokes, a member reciprocating transversely of said turret for removing the hearts of the artichokes, and means for revolving said turret to carry the artichokes successively to and through the spheres of action of said cutting, grooving and heart removing means.

GEORGE D. GARDNER.